(12) United States Patent
Balaji et al.

(10) Patent No.: US 12,688,414 B1
(45) Date of Patent: Jul. 21, 2026

(54) DEEP NEURAL NETWORK TRAINING DATA GENERATION

(71) Applicant: Amazon Technologies, Inc., Seattle, WA (US)

(72) Inventors: Bharathan Balaji, Seattle, WA (US); Venkatesh Rao, Bellevue, WA (US); Krzysztof Marcin Walczak, Sammamish, WA (US); Sujan Kumar Gonugondla, Bridgewater, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 940 days.

(21) Appl. No.: 17/850,351

(22) Filed: Jun. 27, 2022

(51) Int. Cl.
  *G06N 3/08* (2023.01)

(52) U.S. Cl.
  CPC ..................................... *G06N 3/08* (2013.01)

(58) Field of Classification Search
  CPC ........................................................ G06N 3/08
  See application file for complete search history.

(56) References Cited

U.S. PATENT DOCUMENTS

| | | | | |
|---|---|---|---|---|
| 2013/0124081 | A1* | 5/2013 | Khosravy | H04W 4/029 |
| | | | | 701/408 |
| 2016/0146866 | A1* | 5/2016 | Houlette | G01R 21/133 |
| | | | | 702/62 |
| 2022/0036128 | A1* | 2/2022 | Levanony | G06F 18/24 |
| 2022/0044159 | A1* | 2/2022 | Choueiter | G06N 7/01 |
| 2022/0067123 | A1* | 3/2022 | Rafey | G06N 3/0442 |
| 2022/0383206 | A1* | 12/2022 | Luong | G06N 20/20 |
| 2023/0020685 | A1* | 1/2023 | Bizoara | H04W 4/33 |

* cited by examiner

*Primary Examiner* — Reji Kartholy
(74) *Attorney, Agent, or Firm* — Athorus, PLLC

(57) ABSTRACT

Disclosed implementations improve data that is used to train a deep neural network to determine a device type or a device operational state at a location based on voltage data at the location. For example, labeled training data for a location may be up-sampled to increase the amount of labeled training data that is available for use in training the DNN by obtaining labeled data from other known locations that are determined to be similar to the location. Likewise, the up-sampled training data may be subsampled during training to remove potentially noisy data from the training data, thereby improving the accuracy of the trained DNN.

19 Claims, 8 Drawing Sheets

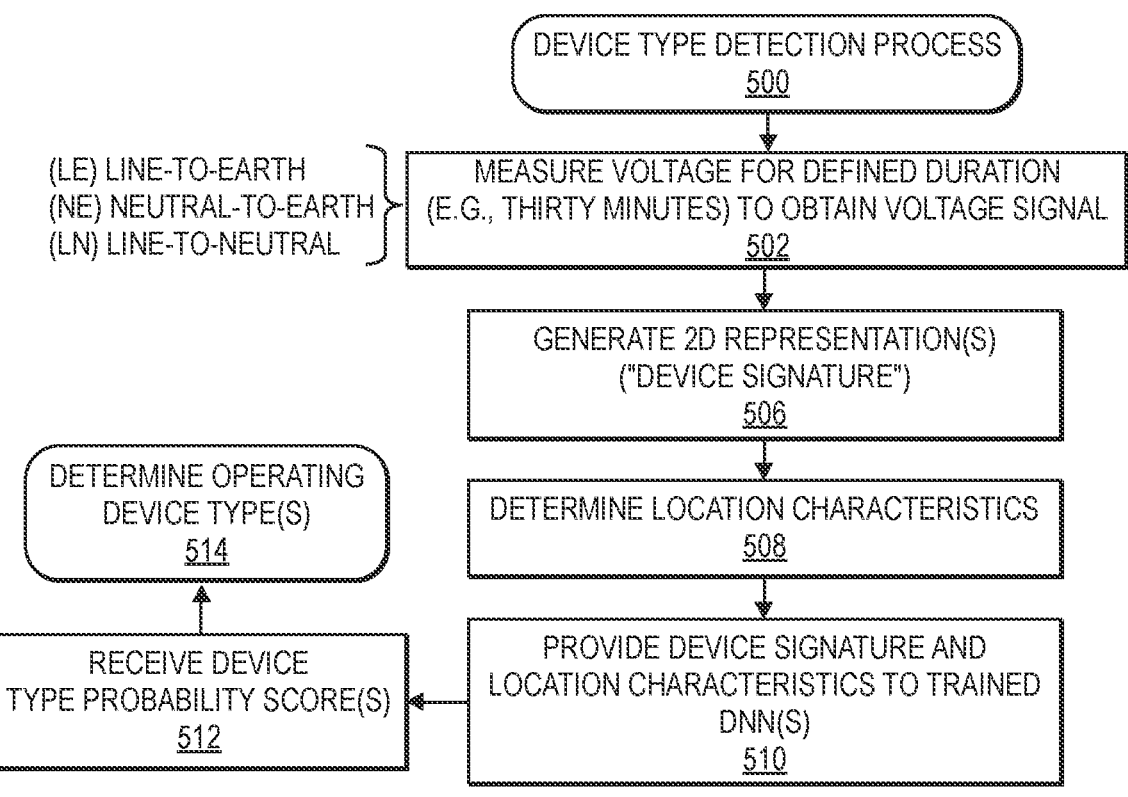

(LE) LINE-TO-EARTH
(NE) NEUTRAL-TO-EARTH
(LN) LINE-TO-NEUTRAL

DEVICE TYPE DETECTION PROCESS
500

MEASURE VOLTAGE FOR DEFINED DURATION
(E.G., THIRTY MINUTES) TO OBTAIN VOLTAGE SIGNAL
502

GENERATE 2D REPRESENTATION(S)
("DEVICE SIGNATURE")
506

DETERMINE OPERATING
DEVICE TYPE(S)
514

DETERMINE LOCATION CHARACTERISTICS
508

RECEIVE DEVICE
TYPE PROBABILITY SCORE(S)
512

PROVIDE DEVICE SIGNATURE AND
LOCATION CHARACTERISTICS TO TRAINED
DNN(S)
510

FIG. 5

DEEP NEURAL NETWORK TRAINING DATA GENERATION

BACKGROUND

There are two basic approaches to device monitoring, such as in-home appliance monitoring: intrusive monitoring and non-intrusive monitoring. In the intrusive case, current sensors are placed into the mains connection of appliances. Although this approach results in high accuracy of appliance state detection, it is not cost effective and not every appliance can be easily instrumented with a current sensor. Non-intrusive monitoring relies on single-point measurements and typically uses low frequency current and voltage measurements. However, measurements from existing systems typically require new instrumentation that must be installed into the electrical circuit at the location by an electrician.

BRIEF DESCRIPTION OF DRAWINGS

The detailed description is described with reference to the accompanying figures.

FIG. 5 is an example device type detection process, in accordance with disclosed implementations.

DETAILED DESCRIPTION

Figure 1:
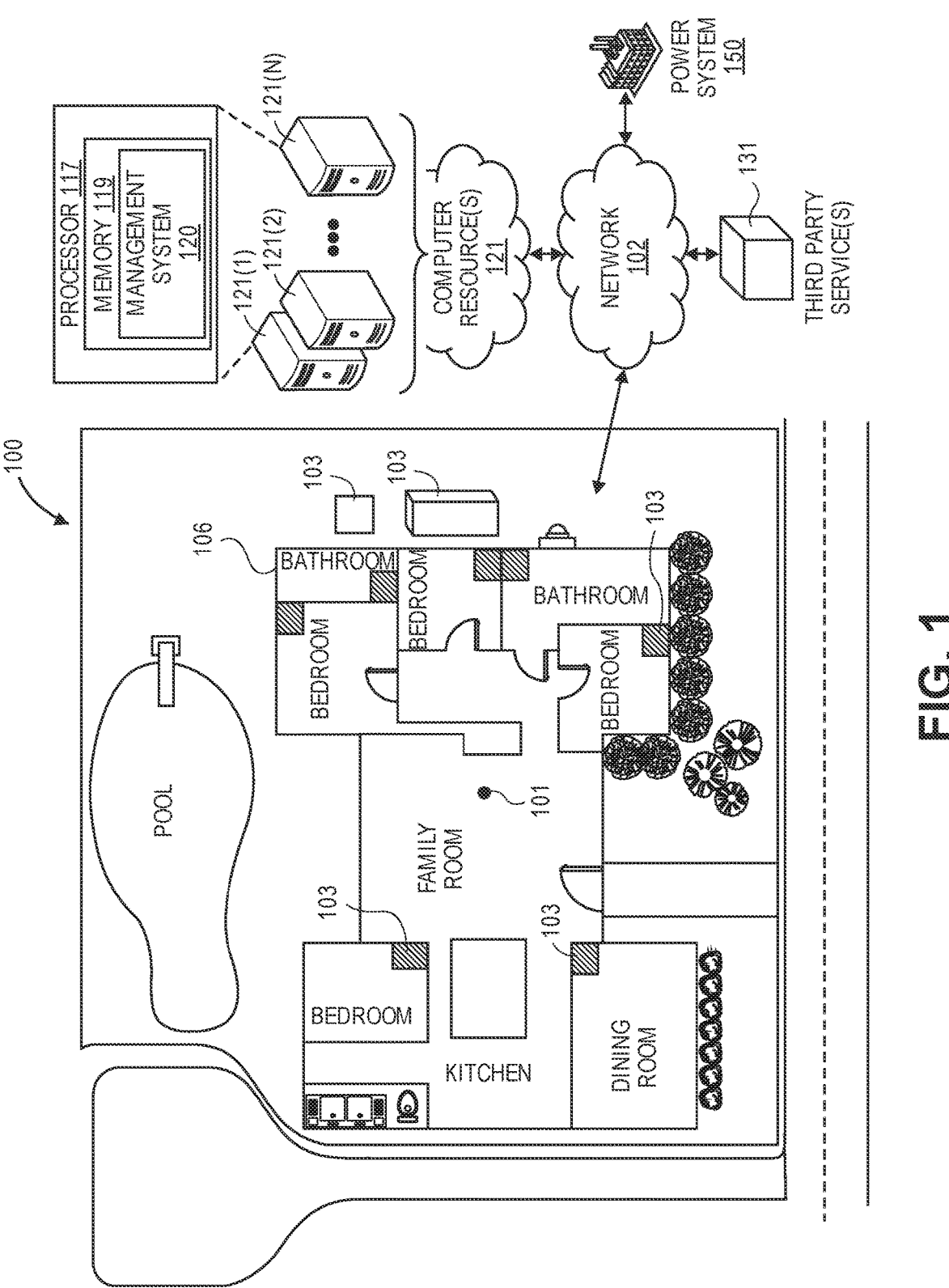
FIG. 1 is a block diagram of a location for which energy consumption is to be monitored and device operations determined, in accordance with disclosed implementations.

Described are systems, methods, and apparatus that improve the data that is used to train a deep neural network ("DNN") to determine device type and/or device operational state of devices at the location. When a device at the location is turned on, the device generates voltage that is introduced into the voltage signal at the location and detectable by, for example, a plug-in sensor. Different devices generate different patterns or signatures as they operate, also referred to herein as signature data, thereby making the signatures unique, or almost unique. However, with the number of potential devices that may be at a location, it is beneficial to utilize data relevant to the location to train a DNN to correctly identify devices operating at the location.

In some implementations, labeled training data for a location may be up-sampled to increase the amount of labeled training data that is available for use in training a DNN for device detection at a specific location. For example, a location signature data may be obtained for a location for which a DNN is to be trained and that location signature data utilized to determine labeled data from other known locations that may be used to train the DNN for the new location. For example, the disclosed implementations may maintain location profiles for hundreds, thousands, or more known locations, that are updated as new information is obtained for the known location. Included in each location profile is information or labeled data indicating signatures of devices at the location and the operation of those devices at the location. Likewise, a known signature data may be maintained for each known location that is representative of the voltage pattern at the location overall. When a DNN is to be trained for a new location, the location signature data for the new location may be generated and compared to existing known signature data for the known locations. One or more of those known locations with a known signature data that is similar to the location signature data of the new location may be selected and the labeled data from the location profile of those one or more known locations utilized to train the DNN for the new location, thereby increasing the amount of labeled training data that is used to train the DNN. By increasing or up-sampling the training data used to train a DNN for a new location using labeled data from other locations having similar signature data increases the accuracy of the DNN in detecting a device and/or device operation.

In some implementations, as discussed below, labeled training data for a location, such as up-sampled training data, may be subsampled to remove unreliable or noisy data. Noisy data, as used herein, is data in which the DNN generates a high probability score that conflicts with the label associated with that data. For example, if the DNN generates a high probability score that the received signature data is indicative of a microwave in operation, but the labeled data indicates that the signature data is indicative of a microwave not operating, the signature data is considered noisy. Such a conflict may occur because either the DNN is improperly detecting the state of the device, or the signature data is incorrectly labeled. By removing such noisy data as part of the DNN training, the accuracy of the resulting trained DNN is improved.

In some implementations, up-sampling and subsampling of training data that is used to train a DNN for a new location may be used together. For example, when a DNN is to be trained for a new location, the training data for that new DNN may be up-sampled, as discussed herein and, during each epoch of training the new DNN, the training data may be subsampled to remove noisy data.

In some implementations, in addition to signature data for a location, labeled training data, etc., in some implementations, other information about the location, presence, or absence of humans at the location, etc., may also be utilized to increase the accuracy in device type determination and/or device operation determination at the location. For example, if new signature data is detected on the electrical circuit of the location, it is determined that the washing machine has recently stopped operation and there is a human present at the location. That information may be collectively used together to determine that the newly detected signature data corresponds to operation of a dryer at the location.

In some implementations, signature data determined by the plug-in sensor, along with the start time and stop time corresponding to each detected signature and respective state of the device, is provided to a remote computing system, referred to herein as a management system. The management system maintains location profiles for each location and may also receive third party data, such as energy consumption information for the location, weather patterns, device signals, etc. The location profiles may identify characteristics about each location, devices at the location, signature data for those devices and/or different states for those devices, the size of a structure at the location, users that occupy the location, the orientation of the location, the altitude of the location, etc.

In some implementations, a plug-in sensor at each location may maintain the DNNs that are trained for the location to identify devices at the location and/or operation of those devices. If a DNN determines device operation based on signature data, the plug-in sensor may identify the device and/or the device state of the device. However, if a trained DNN at the plug-in sensor does not determine the device or operation of a known device type, the detected signature and/or the measured voltage signal may be transmitted from the plug-in sensor to the remote management system for additional analysis. The remote management system may compare the received signature data with a larger data set and/or additional DNNs trained for other device types to determine the device type corresponding to the signature data. Once identified, the trained DNN for the identified device, the device identification, and/or device state identification may be provided to the plug-in sensor and used in the future by the plug-in sensor to identify the device and/or the device state.

FIG. 1 is a block diagram of a location 100 for which device type and operational state are to be determined and monitored, in accordance with disclosed implementations. In this example, the location is a home location that includes a structure 106 in the form of a personal residence. It will be appreciated that the location and corresponding structure may be any location or structure. For example, the location may be residential, business, commercial, public, etc. Likewise, the structure may be a personal residence, apartment, office building, government building, municipal building, entertainment facility (e.g., coliseum, stadium), shopping facility, etc.

One or more plug-in sensors 101 may be positioned at the location 100 by simply plugging in the plug-in sensor into any electrical outlet at the location. In some implementations, two plug-in sensors 101 may be utilized at the location 100, one monitoring each phase of a two-phase power supply at the location. In other implementations, only a single plug-in sensor 101 may be utilized. Additional details about an example plug-in sensor are discussed further below with respect to FIG. 6. Likewise, each location 100 includes one or more devices 103 that consume variable amounts of energy based on their usage. The devices 103 may be internal or inside the structure 106, or external or outside the structure 106, and may provide various functions. In some implementations, the devices 103 may be configured to communicate with a communication component to either receive operation instructions and/or to provide usage information.

As discussed herein, upon installation, the plug-in sensor 101 monitors parameters on the electrical circuit of the location 100. For example, the plug-in sensor 101 may monitor for voltage changes at the location and extract from a baseline voltage for the location, detected voltage changes. For example, a location in the United States may receive 120 volts at 60 Hertz ("Hz") frequency, which represents a baseline that is known for the plug-in sensor 101. The plug-in sensor 101 may then monitor for transient distortions and/or amplitude distortions on the electrical circuit and utilize that information to determine a device type and/or device operational state.

A "transient distortion," as used herein, occurs when an electrical load first turns on and creates an inrush current on an electrical circuit at a location that can be many times higher than the steady state current during operation of that device. Transient distortions can be detected as an impulse response in the voltage that lasts for only a short time. Many devices at a location, such as large appliances (dishwasher, washer, dryer, refrigerator, microwave, oven, etc.), exhibit predictable component sequencing patterns as the device cycles through different stages of operation. For example, a clothes washer has distinct stages of fill, wash, and high-speed spin. An oven turns on the heating elements during pre-heat and then cycles those elements quickly to maintain temperature. While transient distortions occur on short time scales from ten microseconds to one second, component sequencing patterns occur over longer periods of time from one second to forty-eight hours. Accordingly, signature data, as used herein, may include transient distortions that are produced by the device as part of the component sequencing of the device, thereby creating a unique or nearly unique signature for the operation of the device. Likewise, location signature data, as used herein, may include transient distortions that are produced by multiple different devices operating at the same or different times at a location, thereby creating a unique or nearly unique signature for each different location.

As signature data is collected by the plug-in sensor 101, the signature data may be used by the plug-in sensor to identify a device 103 that generated the signature data and/or to determine the state of the device that generated the signature data, as discussed below. In addition, or as an alternative thereto, the signature data may be provided to the management system 120 via a network 102, such as the Internet. Likewise, as discussed further below, location signature data, which may periodically or continually be provided to the management system 120 by plug-in sensors 101 at different locations 100 may be used to identify different locations that have similar combinations of devices 103, based on a similarity of different location signature data.

The system may also include computing resource(s) 121. The computing resource(s) 121 may be remote from the location 100. Likewise, the computing resource(s) 121 may be configured to communicate over a network 102 with the location 100, the plug-in sensor 101, and/or the devices 103. Likewise, the computing resource(s) 121 may communicate over the network 102 with one or more power systems 150, one or more third party service(s) 131, and/or any number of other locations.

As illustrated, the computing resource(s) 121 may be implemented as one or more servers 121(1), 121(2), . . . , 121(N) and may, in some instances, form a portion of a network-accessible computing platform implemented as a computing infrastructure of processors, storage, software, data access, and so forth that is maintained and accessible by components/devices of the system via a network 102, such as an intranet (e.g., local area network), the Internet, etc. The computing resources 121 may process signature data received from the plug-in sensor 101, data from third parties 131 and/or data from the power system 150 to determine devices in operation at the location 100 and/or energy consumed by those devices when operating at the location.

The server system(s) 121 does not require end-user knowledge of the physical location and configuration of the system that delivers the services. Common expressions associated for these remote computing resource(s) 121 include "on-demand computing," "software as a service (Saas)," "platform computing," "network-accessible platform," "cloud services," "data centers," and so forth. Each of the servers 121(1)-(N) include a processor 117 and memory 119, which may store or otherwise have access to a management system 120, as described herein.

The network 102, and each of the other networks discussed herein, may utilize wired technologies (e.g., wires, USB, fiber optic cable, etc.), wireless technologies (e.g., radio frequency, infrared, NFC, cellular, satellite, Bluetooth, etc.), or other connection technologies. The network 102 is representative of any type of communication network, including data and/or voice network, and may be implemented using wired infrastructure (e.g., cable, CAT6, fiber optic cable, etc.), a wireless infrastructure (e.g., RF, cellular, microwave, satellite, Bluetooth, etc.), and/or other connection technologies.

Figure 2:
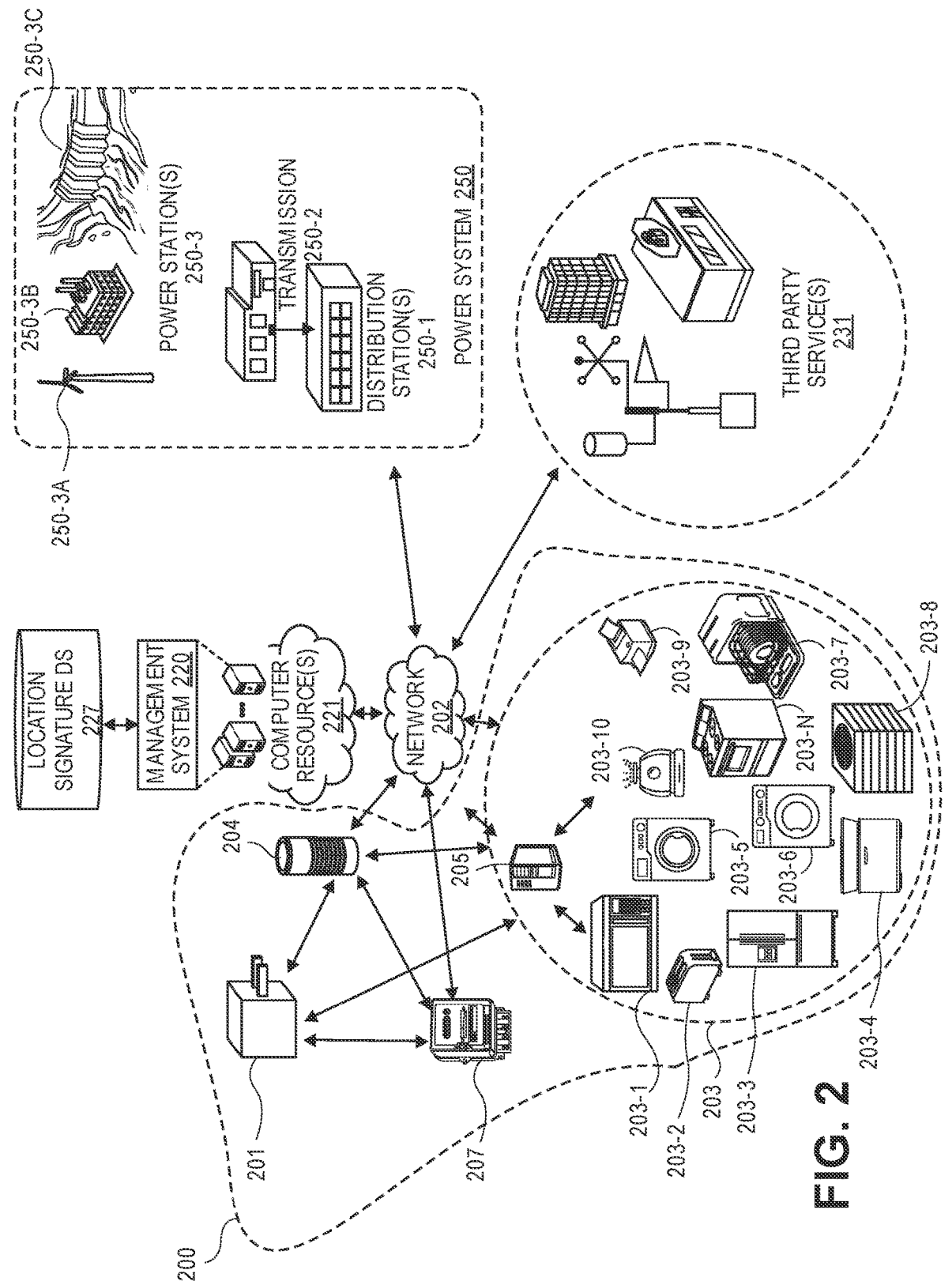
FIG. 2 illustrates a plug-in sensor and devices of the location illustrated in FIG. 1 and the communication paths with remote systems and services, in accordance with disclosed implementations.

FIG. 2 illustrates additional details of a plug-in sensor 201, devices 203, third party systems 231, and the power system 250 illustrated in FIG. 1 and the communication paths therebetween, in accordance with disclosed implementations. Example hardware configurations of the plug-in sensor 201 are discussed further below with respect to FIG. 6. In some implementations, the plug-in sensor 201 may be a stand-alone device that may be plugged into any electrical outlet at the location 200 and used to detect device operation of any other device at the location that is plugged into any other electrical outlet at the location. In other examples, the plug-in sensor 201 may be incorporated into a device 203 and/or included as part of a communication component 204.

The plug-in sensor 201 may by powered by the electrical system at the location 200, by battery power, and/or powered from other devices or components. For example, the plug-in sensor 201 may harvest power from the electrical outlet into which it is installed.

In addition to collecting signature data, the plug-in sensor 201 may be configured to communicate with devices 203, a power meter 207 at the location 200, and/or a communication component 204 that is also positioned within the location. For example, the plug-in sensor 201 may include a wireless transmitter/receiver that is operable to connect to a wireless network 202 and provide determined signature data to other devices 203 and/or the communication component 204 via the wireless network. In other implementations, the plug-in sensor 201 may be configured to transmit data, such as detected signature data, start time and/or stop time of device state changes, and/or device identifiers, to other components, such as the communication component 204 via the electrical circuit at the location 200.

Any form of wired and/or wireless communication may be utilized to facilitate communication between the devices 203 and/or sensors 201. For example, any one or more of 802.15.4 (ZIGBEE), 802.11 (WI-FI), 802.16 (WiMAX), BLUETOOTH, Z-WAVE, near field communication ("NFC"), etc., may be used to communicate between the devices 203 and one or more sensors 201.

Devices 203 at a location 200 may include any one or more items that consume energy during operation. Examples of devices 203 include, but are not limited to microwaves 203-1, toasters 203-2, refrigerators 203-3, freezers 203-4, washing machines 203-5, dryers 203-6, dishwashers 203-7, HVACs 203-8, printers 203-9, coffee makers 203-10, etc. 203-N. In some implementations, the devices 203 may be connected devices capable of receiving instructions, referred to herein as command data, from the management system 220, via a communication hub 205, via the communication component 204, and/or directly. In other implementations, one or more devices 203 may not be connected and may only be controllable by either a user at the location 200 and/or by controlling the circuit that provides power to the device.

Connected devices 203 are configured to receive and execute instructions included in command data sent from the management system 220 operating on a remote computing resource directly, via the communication hub 205 that is positioned at the location 200, and/or via the communication component that is positioned at the location. Likewise, in some implementations, the devices 203 may be further configured to transmit or send operational information (e.g., energy consumption, errors, etc.) to the management system 220, the plug-in sensor 201, and/or the communication component 204. As connected devices 203 are controlled (e.g., turned on/off), the signature data generated in response thereto may be collected, labeled with the device and/or operational state, and associated with the location profile.

In some implementations, the communication hub 205 may forward signature data received from the plug-in sensor 201 to the management system 220 for processing by the management system 220 and/or forward command data received from the management system 220 to various devices 203 for execution. In other implementations, some, or all of the processing of the signature data may be performed by the communication hub 205. For example, the communication hub 205 may receive signature data from the plug-in sensor 201 and process the signature data in an effort to determine device type and/or device operational state of a device that generated the signature data. In other implementations, the communication hub 205 may receive voltage data from the plug-in sensor 201, process the data to determine the signature data, and then utilize the signature data to determine the operating device and/or the state of the operating device. In still other examples, voltage data may be sent to the remote management system 220 and the remote management system may process the voltage data to determine the signature data, devices, device state, etc.

While the described implementation discusses a communication hub 205 and a communication component 204 as distinct components, in some implementations, the operation and functions described herein may be performed entirely by one or both of the communication hub 205 or the communication component 204. Accordingly, the use of the terms communication hub 205 and communication component 204 may, in some implementations, be utilized interchangeably.

Regardless of whether signature data is determined at the plug-in sensor 201, the communication hub 205, the remote computing system 221, and/or some combination thereof, based on the determined parameters, such as signature data determined from the electrical circuit, a device type, a specific device, and/or a device state of a device may be identified. For example, the plug-in sensor 201 and/or the communication hub 205 at the location 200 may maintain, in a memory, one or more DNNs that are trained to determine from signature data the operational state of one or more devices 203 at the location 200. When signature data is generated from voltage data by the plug-in sensor 201, the plug-in sensor and/or communication hub 205 may process the signature data using the one or more DNNs to determine which device(s) is/are operating at the location 200 and the operational state of that/those device(s). If a match is found, the plug-in sensor 201 may transmit to the communication hub 205 and/or the remote management system 220, a device identifier for the device 203 or device type and/or a device state identifier for a state of the device, along with a start time and a stop time of the device state, indicating a start and stop or change in state of the device 203, as determined from the signature data detected in the voltage data. Device state may be any state or detectable change in a device. A device 203 may have two states (on and off) or multiple states. For example, a microwave 203-1 may have multiple states, including, standby, on, activation of the rotatable table, energizing of the magnetron, different power levels, and off. In some implementations, the signature data may be labeled with the device type/device identifier and/or the determined state of the device 203 and associated with the location profile.

In comparison, if the signature data is not usable by a trained DNN to determine operational state of a device 203 known to be at the location 200, the signature data may be sent to the management system 220 for additional analysis. As will be appreciated, the management system 220) may comprise additional compute capacity as well as additional DNNs trained for other devices/device types that may be used to determine the device type and operational state of the device that generated the signature data.

Signature data that is used to train DNNs, as discussed herein, may be generated, or obtained from a variety of sources. For example, device manufacturers may provide device signature data for devices and/or device states of devices. In other implementations, as devices and/or device states are identified at different locations, those device signature data may be aggregated, combined, or added to a device signature data store, the location profile for each location, etc., and used in training DNNs for device detection/operational state determination, as discussed further below. For example, there may be some signature variation between multiple instances of the same type of device or the same device state of multiple devices of the same device type. As the devices and/or device states are determined at locations, the range of that variation may be updated and used to train, or update a trained DNN, to detect the device type and/or operational state, regardless of variation. Accordingly, as additional devices, device states, and/or instances of devices/device states are identified at different locations, those signatures may be included in the signature data store 227, and/or used to train or update the training of DNNs, thereby increasing the management system's 220 ability to identify devices/device states at different locations and to determine if those devices are operating within an expected range, as indicated by the device signature data detected for the device or a device state of that device. As discussed further below, in some implementations, device signature data that is used to train a DNN may be sub-sampled, to remove noisy data and/or up-sampled for a location to increase the signature data that is used to train DNN(s) for that location.

When the management system 220 receives signature data, it may first process the signature data with one or more DNNs to determine a device type and operational state of the device that generated the signature data. In some implementations, upon determination of the device, device type, and/or device state, the management system 220 may send to the communication hub 205 at the location 200, and/or to the plug-in sensor 201, an identification of the newly identified device, device type, and/or device state along with the DNN trained with respect to that device type.

In some implementations, additional information from other devices 203 at the location 200 may also be utilized by the communication hub 205 and/or the management system 220 to determine the device. For example, information received from one or more connected devices 203 may be used to limit or identify candidate devices that are known to be operating and/or to remove from consideration devices that are known to not be operating. Likewise, sensors at the location 200 may be used to assist in device determination.

For example, a light or motion sensor may provide data indicating whether a person is moving in areas of the location and/or whether lights are on/off within areas of the location. As another example, image data and/or other information, such as device identification of a device in the possession of a person, may be used to identify a person at the location. Such information, referred to herein as supplemental information, may be used to expand or reduce the list of candidate devices that may be operating and generating the detected signal.

In some implementations, third party systems 231 may also provide data, such as weather data, device data, expected energy consumption for devices, device signature data, etc., to the management system 220. Third party systems 231 include any type of system or service that is independent of the location 200 that provides data that may be used by the management system 220 to determine a device type and/or operational state of a device at the location. For example, the third-party system 231 may be a device manufacturer that provides expected energy consumption information for devices 203 and/or signature data for devices. In such an example, the management system 220 may utilize the expected energy consumption information for a device 203 to determine if that specific device is operating as expected and/or whether replacement of an existing device with a different device of the same device type will save energy.

The power system 250 may also communicate with the management system 220 and provide, for example, energy consumption information for the location 200, demanded power information, or load on the power system, forecasted power demands, costs per unit of power under different operational constraints, etc. For example, the power system 250 may provide information to the management system 220 indicating which power stations are currently operating, the cost per unit of energy produced, and the current load on the power station, also referred to herein as load value. Alternatively, or in addition thereto, energy consumption for a specific location may be provided by a device at the location, such as the power meter 207.

A power system 250 typically includes one or more power station(s) 250-3, transmission station(s) 250-2, and distribution station(s) 250-1. Locations, such as location 200 create demand for power provided by the power system 250 and pay for that power.

Power stations 250-3 may include any form of power generation. For example, a power station 250-3 may be a wind-based power station 250-3A, such as a wind farm, a fossil-fuel based power station 250-3B, a hydroelectric power station 250-3C, a solar power station, a nuclear power station, etc. The power system 250 may include any number and type of power stations 250-3.

Electric-power generated by the power stations 250-3 is bulk transmitted at high-voltages via a series of transmission 250-2 lines and stations from the generating power stations 250-3 to distribution stations 250-1. Transmission 250-2 lines and stations when interconnected with each other create transmission networks, which are often referred to as "power grids." The United States has three major power grids, the Western Interconnection, the Eastern Interconnection and the Electric Reliability Council of Texas (ERCOT) grid, often referred to as the Western Grid, the Eastern Grid and the Texas Grid.

The distribution stations 250-1 are located near the locations 200 that create the demand for the power. The distribution stations 250-1 receive the bulk transmissions, step down the voltage, and distribute the electricity to end locations 200, such as residential housing, businesses, commercial buildings, etc.

A few of the major constraints with power systems is that power within the system must run at the same frequency and, with only a few exceptions, electrical energy cannot be stored. As such, power must be generated and supplied in real-time at a rate that matches demand. If the demand for power exceeds supply, additional power stations 250-3 must be activated to fulfill the additional demand, or brownouts or blackouts may be experienced at numerous locations that rely upon that power. The distribution stations 250-1 typically bill the locations for the consumption of energy as a measure of kilowatt-hours (kWh), which is a measure of energy. The rate per kWh generally varies based on the current power demand or load of the power system 250 and/or based on the average or expected power demand on the power system. As the power demand on the power system 250 increases, the cost per unit of energy consumed by each location likewise typically increases.

Figure 3:
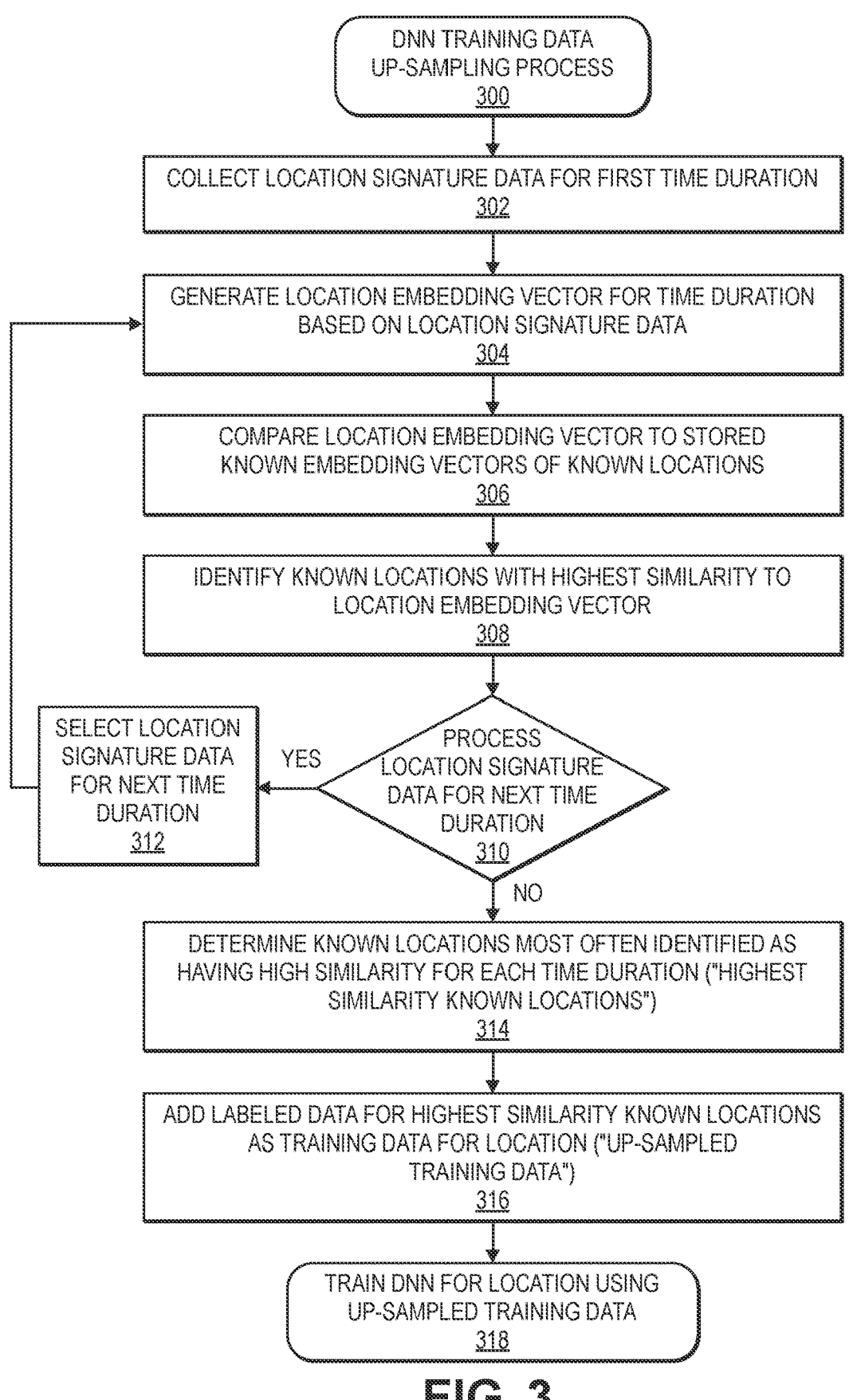
FIG. 3 is an example deep neural network training data up-sampling process, in accordance with disclosed implementations.

FIG. 3 describes an example DNN training data up-sampling process 300, in accordance with disclosed implementations. The example process 300 may be utilized to generate a large set of training data that may be used to train a DNN to accurately detect and/or to increase or enlarge an existing set of training data for use in training a DNN for a location.

The example process 300 begins by collecting or receiving a location signature data during a first period of time for a location for which a DNN is to be trained, as in 302. The location signature data may be for any defined duration of time (e.g., thirty minutes). For example, when a plug-in sensor is added to a new location, the plug-in sensor, as part of activation or setup, may measure the voltage signal on the electrical circuit(s) of the location and generate a location signature data for the location.

The location signature data may then be used to generate a location embedding vector for the time duration, as in 304. For example, the location signature data for the location may be processed to generate a low dimensional embedding vector that is representative of the location signature data. For example, a multi-dimensional embedding vector may be generated that is compressed to a vector of defined size (e.g., 1024), referred to herein as a location embedding vector. Any of a variety of techniques may be used to generate an embedding vector representative of the location signature data. Likewise, the resulting location embedding vector may be of any defined size.

The location embedding vector may be compared to stored known embedding vectors for known locations, as in 306. For example, known embedding vectors of similar dimensions may be maintained for known locations and the location embedding vector may be compared to some, or all of the known embedding vectors for the known locations. In some implementations, each known location may have multiple known embedding vectors, each known embedding vector representative of a different period of time for the known location. For example, a first known embedding vector may be generated and maintained for a first known location for a first period of time (e.g., 09:30-10:00), a second known embedding vector may be generated and maintained for the first known location for a second period of time (e.g., 12:30-13:00). Different known embedding vectors may be generated for the same known location because different location signature data may exist for the location at different times, because different devices may be operating during those different times.

Based on the comparison of the location embedding vector with known embedding vectors, one or more known locations are identified as having a highest similarity with the location embedding vector, as in 308. For example, the comparison of the location embedding vector with known embedding vectors may determine a distance between the embedding vectors in a multi-dimensional space, as is known in the art, and the known embedding vectors that are closest in distance to the location embedding vector are considered to be the most similar to the location embedding vector. In some implementations, a defined number of known locations corresponding to the known embedding vectors closest to the location embedding vector may be selected. In other examples, all known locations corresponding to a known embedding vector that is within a defined distance (or within a defined similarity) of the location embedding vector may be selected. In still other examples, either a maximum number of known locations may be selected or up to a maximum distance/similarity may be selected.

After determining one or more known locations that are similar to the location for which at DNN is to be trained, a determination may be made as to whether location signature data for a next time duration is to be processed, as in 310. If it is determined that location signature data for the location is to be processed for a next time duration, the location signature data at a next time duration is obtained or selected, as in block 312, and the example process 300 returns to block 304 and continues.

If it is determined that location signature data at a next time duration is not to be processed for the location, known locations that are most often identified by the example process 300 as being similar to the location are determined, referred to herein as highest similarity known locations, as in 314. For example, if the example process 300 processes location signature data for ten different time durations, several of the known locations may be determined to be similar to the location embedding vectors for multiple different time durations. The known locations that are most frequently identified as having a high similarity to the location are likely to have similar devices and/or other similar voltage based characteristics. In some implementations, a defined number of highest similarity known locations may be selected. In other implementations, all known locations that have at least a defined similarity score or are within a defined distance of the location embedding vector may be selected as the highest similarity known locations. In other implementations, other factors may be considered in determining the highest similarity known locations.

The labeled data associated with the determined highest similarity known locations may then be combined as up-sampled training data for the location, as in 316. Finally, the up-sampled training data may be used to train a DNN for the location, as in 318.

Generating up-sampled training data improves the ability to train a DNN for a previously unknown location, without requiring significant training or input from a user at the location.

Figure 4:
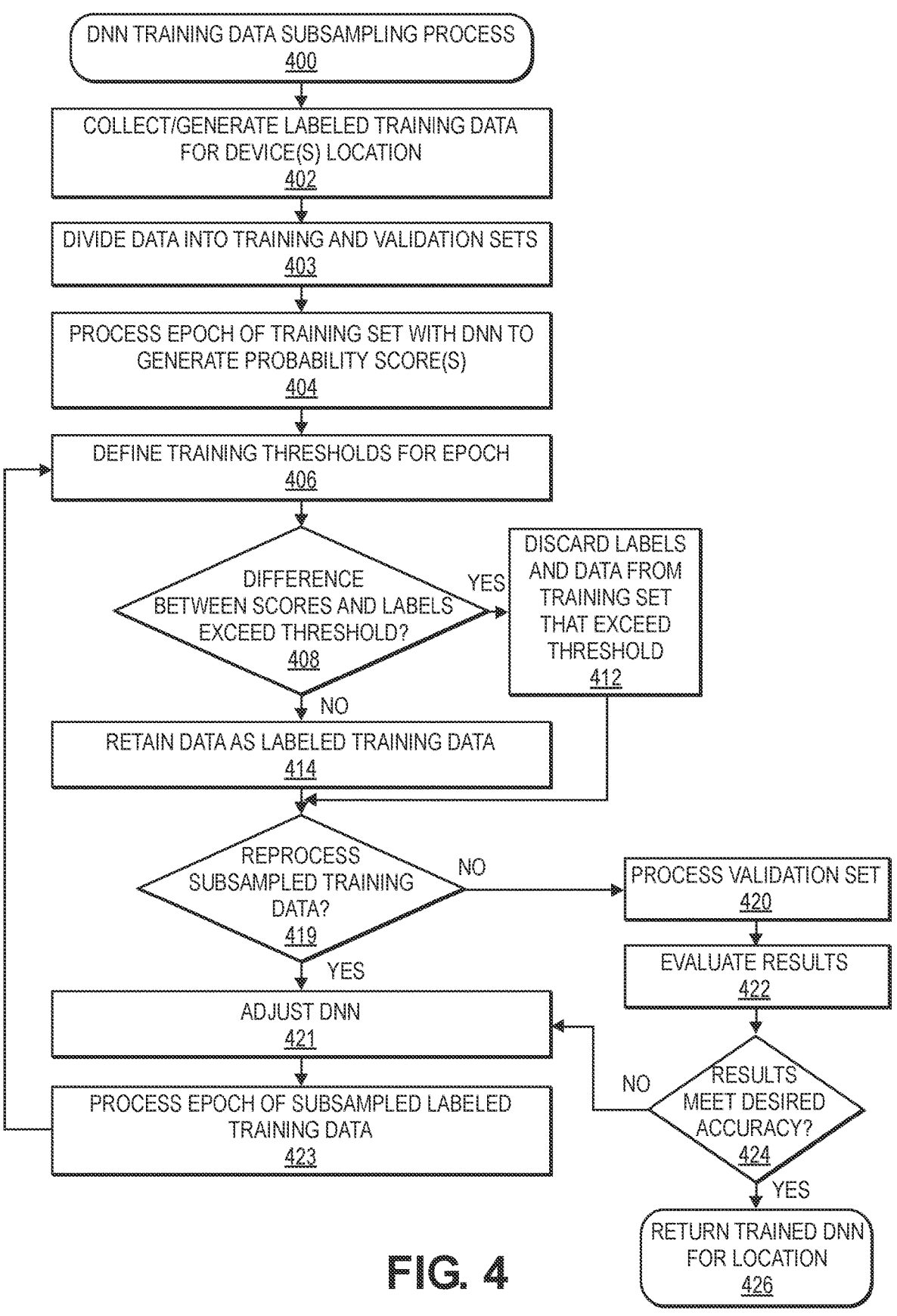
FIG. 4 is an example deep neural network subsampling training data process, in accordance with disclosed implementations.

FIG. 4 is an example subsampling deep neural network training process 400, in accordance with disclosed implementations.

The example process 400 begins by collecting and/or generating labeled training data for one or more devices at a location, as in 402. As discussed herein, in some implementations, data samples that are included in the labeled training data may be obtained or up-sampled from one or more known locations that are determined to be similar to the location for which the example process 400 is being performed. Alternatively, or in addition thereto, as part of setup of a plug-in sensor, a user may activate/deactivate different devices within the location and signature data for those devices monitored, labeled, and included as a data sample of labeled training data to train a DNN for the location.

Upon obtaining or generating labeled training data, the labeled training data is divided into training and validation sets, as in 403. Generally speaking, the data samples in the training set are used to train the untrained DNN and the data samples in the validation set are used to validate the training of the DNN.

An epoch, or one iteration through the data samples of the training set, may be processed with the DNN that is being trained and the DNN may generate probability scores for each data sample of the training set that is processed during the epoch, as in 404.

In some implementations, the DNN may only be designed to output a single probability score for each data sample indicative of whether a particular device (e.g., oven, toaster, dishwasher, etc.) is operating or not operating. In other implementations, the DNN may be trained to generate multiple outputs for each input data sample, with each output indicating a probability score indicative of whether a particular device type is operating or not operating.

In addition to processing an epoch of the training set of training data, a threshold is defined for the output accuracy, as in 406. A threshold may be any difference or amount of disagreement between the probability score output by the DNN and the label associated with the input training data. Likewise, the output may be different for different DNNs, different processing of epochs of training data by the same DNN, etc. For example, if the DNN is being trained to detect operation of a toaster, a threshold may be defined as a threshold difference between the probability score output by the DNN upon processing a data sample during an epoch and the label associated with the data sample. For example, the threshold may be a degree or amount of difference allowable between the label of the training data and the output of the DNN.

For each instance in which the difference between the output by the DNN and the label of the data sample of the training data exceeds the threshold, as in 408, the label and data sample is considered noisy and discarded from the training data, as in 412. As noted above, noisy data is data in which the DNN generates an output that is different, beyond the threshold, than the label for the data sample. For example, if the data sample input and processed by the DNN is labeled to correspond to a toaster turning on and the output of the DNN indicates a high probability that the toaster is off, the difference between the output and the label may exceed the threshold and the data considered noisy. Noisy data may result from, for example, the input data sample being improperly labeled, the DNN not being able to properly determine the device state based on the input, or a combination thereof.

For data samples in which it is determined at decision block 408 that the difference between the probability score output by the DNN and the label does not exceed the threshold, the data is retained as labeled training data, as in 414.

After discarding data samples from the labeled training data, as in block 412, and/or after retaining data samples as labeled training data, as in block 414, a determination is made as to whether a next epoch of the retained labeled training data, referred to herein as subsampled training data, is to be processed, as in 419. If it is determined that a next epoch of the subsampled training data is to be processed, the accuracy of the outputs determined by the DNN for each epoch of the labeled training data that was not discarded is determined and aspects of the DNN may be adjusted in an effort to guide the DNN to generate more accurate results, as in 421. After adjusting aspects of the DNN, a next epoch of the subsampled labeled training data is processed by the adjusted DNN, as in 423. After processing a next epoch of the subsampled labeled training data, the example process 400 returns to block 406 and continues. In some implementations, the same threshold may be used for each epoch through the training data. In other implementations, the threshold may be adjusted with each epoch. For example, the threshold may be lowered for each epoch through the subsampled training data such that the difference between the output by the DNN and the label of the training data must decrease with each epoch, or the data may be indicated as noisy and discarded.

Returning to decision block 419, if it is determined that a next epoch through the subsampled labeled training data is not to be processed, the validation set of training data may be processed by the DNN, as in 420, and the results evaluated to determine the accuracy of the predictions generated by the DNN when compared to the labels of the data samples of the valuation set, as in 422. A determination may then be made as to whether a desired accuracy level, in processing the validation set, has been achieved, as in 424. The desired accuracy level may be any level of accuracy determined for training of the DNN and may vary for different DNNs, different locations, different users, etc. If it is determined that the desired accuracy level is not achieved, the example process 400 returns to block 421 and continues.

Alternatively, if it is determined that the desired accuracy level is achieved, training of the DNN is finalized and the trained DNN is generated and returned for the location, as in 426. Typically, though not exclusively, as part of finalizing the now-trained DNN, portions of the DNN that are included in the model during training for training purposes may be extracted, thereby generating a more efficient trained DNN.

In some implementations, the process 400 may be periodically performed to update training of an existing trained DNN to include in the training newly identified labeled training data that is obtained from the location and/or other locations, thereby keeping the trained DNN current and further improving the accuracy of the DNN for the location.

Subsampling the training data upon processing of each epoch provides a technical improvement over existing systems because it removes, without user intervention, noisy data from the labeled training data so that the noisy data is not considered in future epochs through the training data as part of training the DNN. With the example process 400, large volumes of training data may be utilized, and the example process 400 will remove from considerations aspects of the training data that may otherwise result in inaccuracies in the resulting trained DNN. As a result, the trained DNN will be more accurate.

While the example process 400 describes processing through an epoch of data samples and upon completion of the epoch removing data samples that are determined to be noisy, in other implementations, each data sample, as it is processed as part of an epoch, may be evaluated to determine if the result of the output of the DNN exceeds the difference threshold and the data sample either retained or discarded.

FIG. 5 is an example device type detection process 500, in accordance with disclosed implementations.

The example process 500 begins by measuring a voltage on an electrical circuit for a defined duration, such as thirty minutes, to obtain a voltage signal, as in 502. The defined duration may be different for different devices. For example, many devices have a sequencing pattern that is less than thirty minutes. For devices with a sequencing pattern that is longer than thirty minutes, the defined duration may be longer. Likewise, for devices with shorter sequencing patterns, the defined duration may be shorter. In addition, as illustrated, in some implementations, the voltage may be measured across different combinations of wires of the electrical circuit. For example, a first voltage signal having the defined duration may be measured across the line-to-earth ("LE") lines, a second voltage signal may be measured across the neutral-to-earth ("NE") lines, and a third voltage signal may be measured across the line-to-neutral ("LN") lines. In other implementations, the voltage signal may only be measured across two pairs of lines, such as the LE lines and the NE lines.

The voltage signal(s) may then be combined to generate a device signature, which may include one or more 2D representations of the transient distortions and/or the amplitude distortion, as in 506. In addition, in some implementations, location characteristics may be determined for the location, as in 508. Location characteristics may include, but are not limited to, occupancy information, time of day, day of week, an operation of a second device type at the location, weather at the location, a device type known to be at the location, a location type of the location, etc. The device signature and any location characteristics may then be provided to one or more trained DNNs, as in 510, and device type probability scores received from each of those DNNs, each device probability score indicative of a probability that the device signature corresponds to a device for which the DNN was trained, as in 512. Based on the probability scores, a device type, and optionally an operational state of the device type, may be determined, as in 514.

Figure 6:
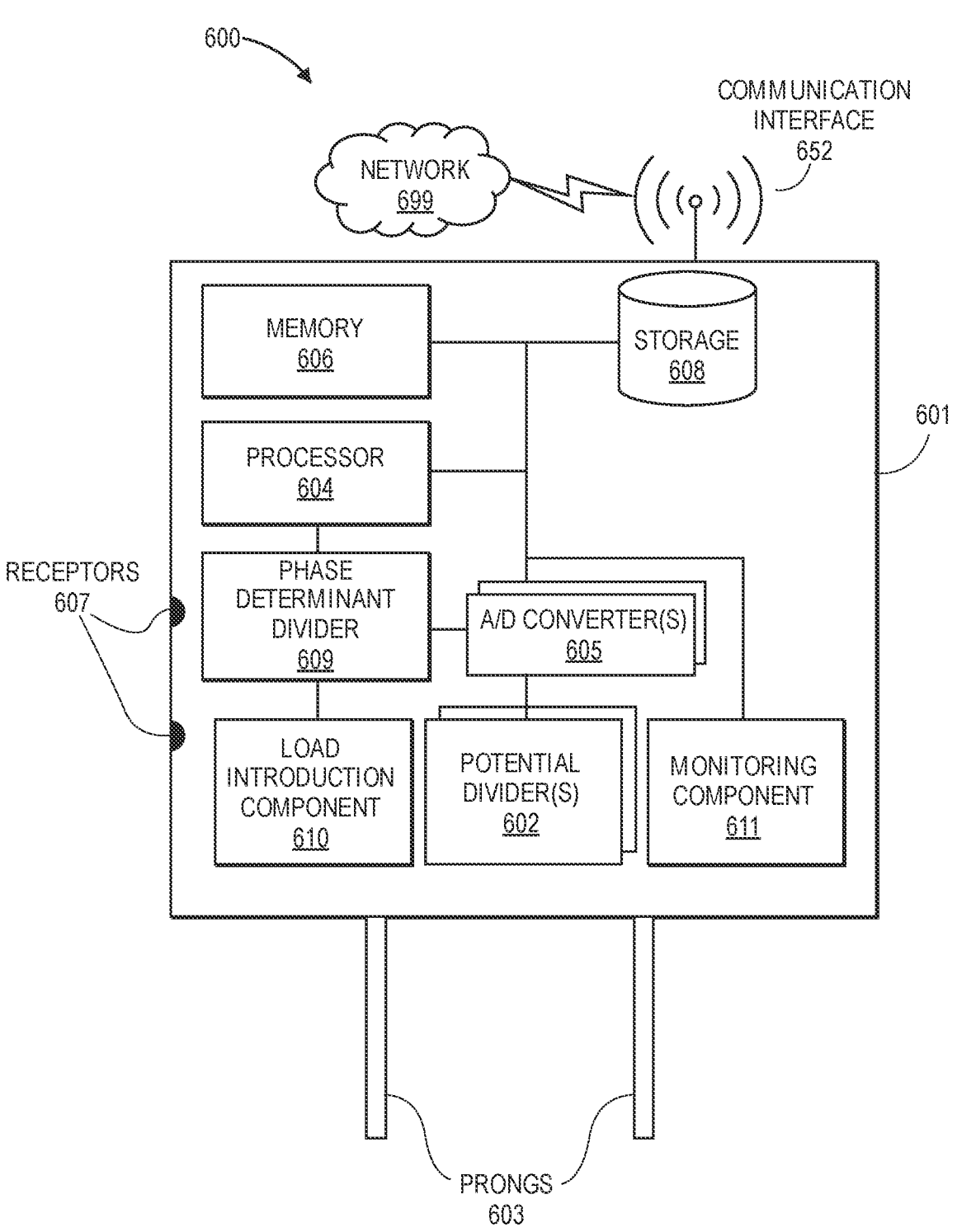
FIG. 6 illustrates example components of a plug-in sensor, in accordance with disclosed implementations.

FIG. 6 illustrates example components of a plug-in sensor 600, in accordance with disclosed implementations. In implementations, the plug-in sensor 600 is configured to be installed into an electrical outlet to interact with an electrical circuit at the location. As such, the plug-in sensor may include an insulating housing 601, such as a plastic body or shell. In some implementations, the housing 601 will be in the form of a cube such that the plug-in sensor has an appearance of a charger or other common electrical component. Protruding from the housing is at least one prong 603. In most instances, as illustrated in FIG. 6, there are two prongs 603 extending from the housing. In some implementations, there may be a third prong, or ground (earth) prong. The prongs interface with the electrical circuit at the location and enable the plug-in sensor to be inserted into an electrical outlet at the location, to monitor voltage at the location, transmit codes, and/or introduce loads into the circuit at the location. For example, the prongs 603 may be inserted into a common electrical outlet at the location.

Coupled to the prongs 603 are one or more potential dividers 602, such as voltage dividers. In some implementations there are three potential dividers, one for voltage measured from the lead line, one for voltage measured from the neutral line, and one for voltage measured from the earth line. In other implementations, there may be additional or fewer potential dividers 602. The potential dividers 602 convert a high voltage, such as 120 volts, of the electrical circuit at the location into a lower voltage that can be recorded and analyzed at high frequencies (e.g., 200 kilohertz).

The one or more potential dividers may be coupled to one or more analog-to-digital converters 605. The analog-to-digital converters receive the high frequency sampling produced by the one or more potential dividers 602 and convert the analog signal to digital data, referred to herein as voltage data. The voltage data may be stored to memory, such as a random-access memory ("RAM"), flash memory, or other forms of permanent or temporary storage 608. Any form of memory may be used with the disclosed implementations.

The prongs 603 may also be coupled to a load introduction component 610, a phase determinant divider 609, and/or a monitoring component 611. The load introduction component 610 may be operable to introduce one or more loads into the electrical circuit to which the plug-in sensor 600 is coupled. For example, the load introduction component 610 may be operable to introduce any one or more of a resistive load, an inductive load, or a capacitive load into the electrical circuit. The code transmitter component may be operable to transmit one or more codes that may be detectable by other plug-in sensors and/or communication components at the location to determine if two or more plug-in sensors are on the same phase of the electrical circuit at the location. The phase determinant divider 609 may be configured to determine the phase or current on the electrical circuit to which the plug-in sensor 600 is connected. Likewise, the monitoring component 611 may be configured to monitor voltage patterns on the electrical circuit and/or detect codes transmitted from other plug-in sensors 600.

As discussed above, the monitoring component 611 may include components that are configured to measure voltage signals between the lead and earth line, the neutral and earth line, and/or the lead and neutral line. The voltage patterns in the different lines (lead, neutral, earth) may be monitored simultaneously by different components of the monitoring component 611. Likewise, the monitoring component 611 may be in communication with the processor 604, the memory 606, and/or the communication interface 652.

The memory 606 stores program instructions that are executable by the one or more processors 604 to cause the one or more processors to perform any one or more portions of the implementations discussed herein. For example, the memory 606 may store one or more DNNs trained using subsampled and/or up-sampled training data for the location. In addition, the memory 606 and/or the storage 608 may also maintain a signature data store that includes, for example, signature data of devices known to be at the location and/or device states of devices known to be at the location.

The plug-in sensor 600 may also include a communication interface 652, such as a wireless antenna, which enables the plug-in sensor to connect to one or more wireless networks 699, such as a Wi-Fi network, Bluetooth network, etc., and transmit or receive information, such as detected signature data, voltage data, codes, etc.

In some implementations, the plug-in sensor 600 may also include a pair of electrical prong receptors 607 that are configured to receive electrical prongs of another device and allow alternating current to passthrough so that the electrical outlet may be utilized by another device, in addition to the plug-in sensor 600. In still other implementations, the components of the plug-in sensor 600 may be incorporated entirely into another device, such as a communication component, a communication hub, a device, etc.

Figure 7:
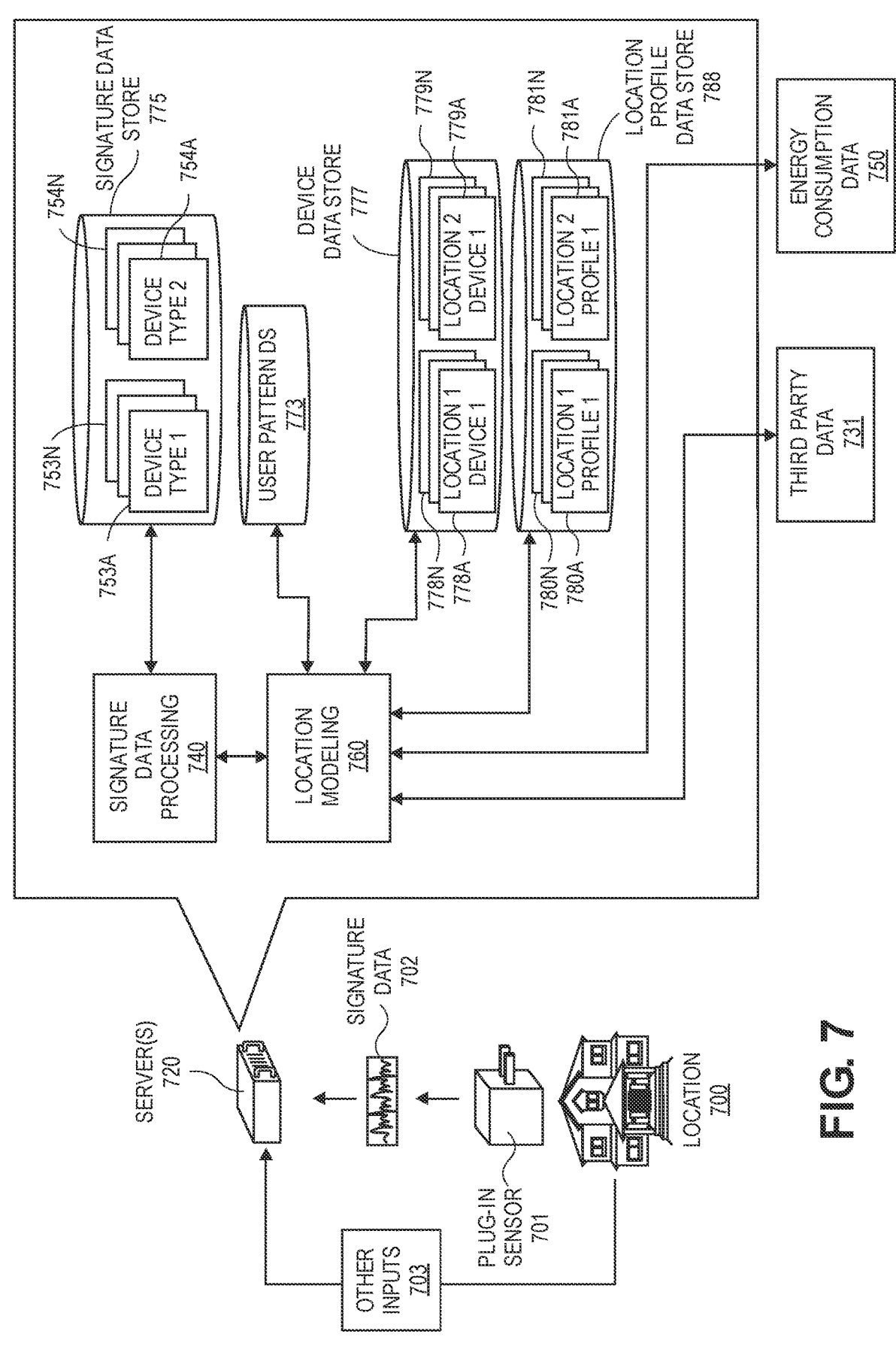
FIG. 7 illustrates example components of a management system, in accordance with disclosed implementations.

FIG. 7 is a conceptual diagram of a server 720 that processes voltage signal/signature data 702 and/or other inputs 703 received from plug-in sensors 701 at various locations 700 and receives third party data 731 from third parties. The various components of the server 720 may be located on the same or different physical devices. Communication between various components illustrated in FIG. 7 may occur directly or across a network. In operation, the server 720 may include computer-readable and computer-executable instructions that reside on the server 720 and perform one or more of the described features or functions, also referred to herein as a management system.

Device signature data 702, or voltage data, from one or more plug-in sensors 701 at a location 700 may be transmitted in real time, near real time, or periodically to one or more remote computing resources, illustrated in this example as a server 720. The server receives and processes the signature data 702 or the voltage data with signature data processing 740. Processing may include processing the voltage data to determine signature data and/or determining a device type and/or device state that generated the signature data 702.

The device types and/or device signature data maintained in the signature data store 775 may be aggregated from multiple locations as devices at those locations are determined. The aggregated data may then be used to identify devices and/or device states of devices at other locations and, as those devices/device states are identified, the device signature data at those locations may be added to the data store. As such, the signature data store 775 will continue to expand and include device signature data for more devices, device states of devices, and/or different known locations.

In some implementations, rather than voltage data or signature data 702 being sent from the location 700 to the servers 720, the plug-in sensor 701, a communication hub at the location, or a communication component at the location may process the signature data to determine a device, device type, and/or device state of a device at the location that generated the signature data. A device identifier of the determined device and/or device state, a start time and a stop time corresponding to the signature data, and the location identifier for the known location may then be sent to the servers 720 for additional processing.

As signature data 702 is collected and devices and/or device states determined, the information, including the device and/or device state identifiers, signature data, times of operation, etc., may be aggregated with other signature data generated by other devices at the location 700 to develop a location profile 780, that is stored in a location profile data store 788, using a location modeling component 760. The location profile 780 may include device identifiers and/or signature data for devices and/or device states of devices known or determined to be at the location 700, any operational relationships between devices and/or device states, signature data of those devices and/or device states, predicted times when those devices will be operating in different device states, an overall location signature data, etc. In addition, in some implementations, the location profile 780 may also maintain expected and/or actual energy consumption information for detected devices. For example, received third party data 731 may include expected energy consumption information for different device models. The location modeling component 760 may also receive energy consumption data 750) and utilize that information to determine actual energy consumption for devices at the location. As discussed above, the changes in actual energy consumption at different periods of time may be combined with start times and stop times of determined device operation at the location 700 to determine the amount of energy actually consumed by devices at the location during operation.

As location profiles 780 are developed for different locations, those profiles may be stored in a location profile data store 788. In some implementations, different location profiles may be generated for a location based on, for example, the day of the week, the number of people at the location, etc. Over time, multiple location profiles may be created for each location and maintained in the location profile data store 788. For example, location 1 may include multiple location profiles 780A-780N generated at different points in time for that location. Likewise, location 2 may include multiple location profiles 781A-781N generated at different points in time for that location. Every location may include one or more location profiles that are stored in the location profile data store 788. The location profiles, which may be associated with different periods of time during the year, may be used to predict device states and times during which devices are in high demand/high use or low demand/low use. Likewise, each location profile may have a corresponding embedding vector generated based on voltage signatures measured during the period of time corresponding to the location profile.

In some implementations, signature data and/or voltage data 702 may likewise be used to determine user profiles and/or usage patterns corresponding to the location 700. For example, signature data and/or voltage data may be used to determine the presence or absence of users at the location and/or at particular areas within the location. As users typically follow a patterned behavior, over time, the signature data may be used to determine those user patterns and such information may be stored in the user pattern data store 773. For example, signature data from device operation of devices at the location may be aggregated over a period of time (e.g., thirty days) to determine that on Monday, Tuesday, Wednesday, Thursday, and Friday, a user at the location generally enters the kitchen within the structure between 05:00 hours and 05:30 hours, moves to a second room between 06:30 hours and 07:30 hours and then departs the location until approximately 18:00 hours. Such information may be maintained in the user profile for the user.

In some implementations, a device data store 777 may also be maintained. The device data store 777 may include information regarding devices at each location. For example, the device data store may maintain device information 778A-778N for each of multiple different devices at a first location, maintain device information 779A-779N for each of multiple different devices at a second location, etc.

Device information may include, among other information, signature data generated by different device states of the device, the manufacturer of the device, the make, model, and year of manufacture, the power rating of the device, the efficiency of the device, etc. In some implementations, data received from a same type of device operating at different locations may be compared to determine consistency among devices and/or to detect potential device problems or abnormalities. For example, if there are fifty microwaves of Brand A and forty-nine of them have similar power demands but the fiftieth one has a higher power demand, it may be determined that the fiftieth microwave is potentially malfunctioning.

Figure 8:
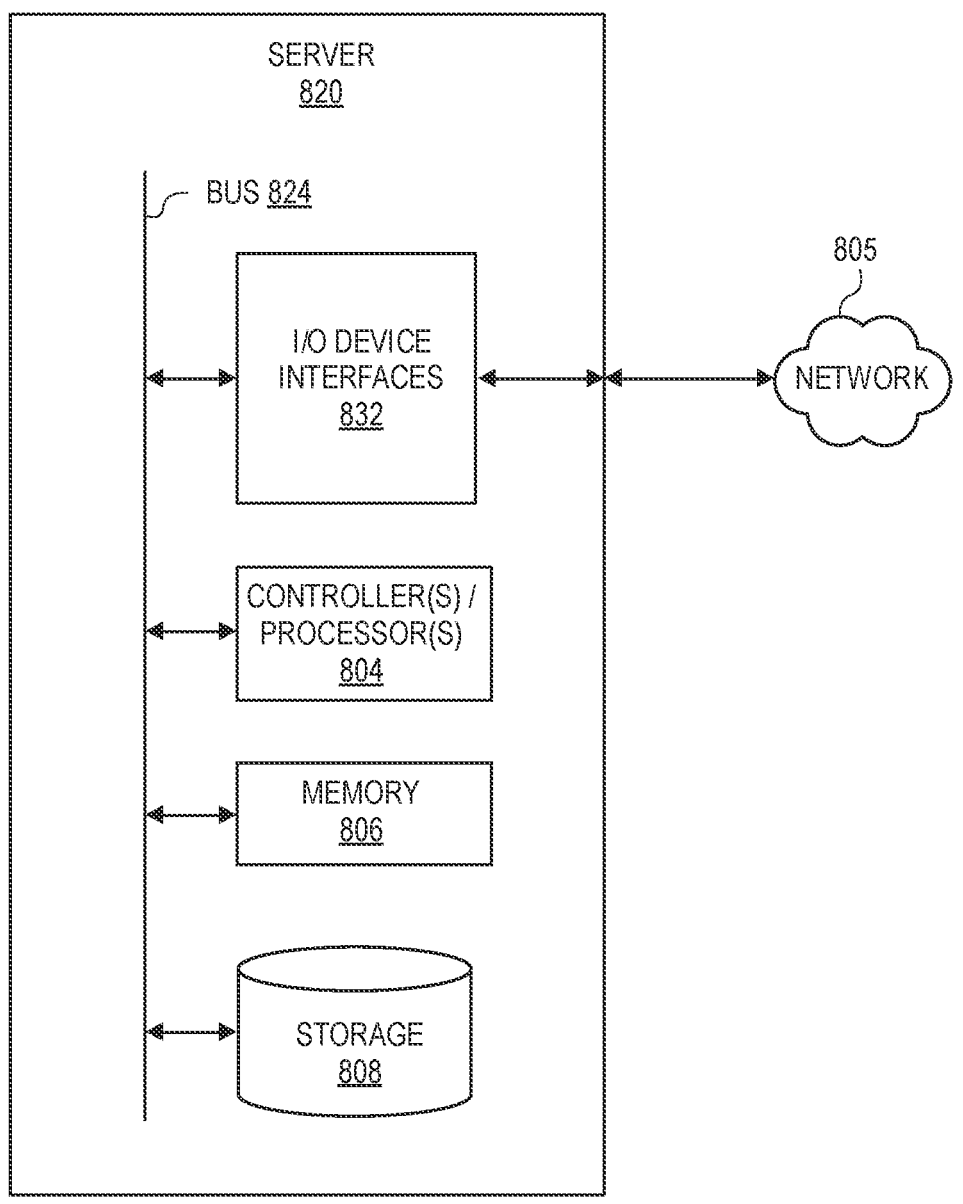
FIG. 8 illustrates example components of a server, in accordance with disclosed implementations.

FIG. 8 is a block diagram conceptually illustrating example components of a remote device, such as a remote server 820 that may assist with command processing, sub-sampling training data, up-sampling training data, training DNNs for a location, and/or operation of the management system. In operation, the server 820 may include computer-readable and computer-executable instructions that reside on the server 820, as will be discussed further below:

The server 820 may include one or more controllers/processors 804, that may include a central processing unit (CPU) for processing data and computer-readable instructions, and a memory 806 for storing data and instructions of the respective device. The memories 806 may individually include volatile random-access memory (RAM), non-volatile read only memory (ROM), non-volatile magnetoresistive random-access memory (MRAM) and/or other types of memory. The server 820 may also include a data storage component 808, for storing data and controller/processor-executable instructions. The data storage component 808 may include one or more non-volatile storage types such as magnetic storage, optical storage, solid-state storage, etc. The server 820 may also be connected to removable or external non-volatile memory and/or storage (such as a removable memory card, memory key drive, networked storage, etc.) through an input/output device interface 832.

Computer instructions for operating the server 820 and its various components may be executed by the controller(s)/processor(s) 804, using the memory 806 as temporary "working" storage at runtime. The server's 820 computer instructions may be stored in a non-transitory manner in non-volatile memory 806, storage 808, or an external device(s). Alternatively, some or all of the executable instructions may be embedded in hardware or firmware on the respective device in addition to, or instead of software.

The server 820 may also include input/output device interfaces 832. A variety of components may be connected through the input/output device interfaces. Additionally, the server 820 may include an address/data bus 824 for conveying data among components of the server 820. Each component within the server 820 may also be directly connected to other components in addition to (or instead of) being connected to other components across the bus 824.

The server 820 may wirelessly communicate with and receive signature data and/or voltage data from locations and/or provide instructions to devices within the location and/or receive data from the devices. Any form of wired and/or wireless communication may be utilized to facilitate communication between the server 820, plug-in sensors, communication hubs, communication components, and/or devices. For example, any one or more of 802.15.4 (ZIG-BEE), 802.11 (WI-FI), 802.16 (WiMAX), BLUETOOTH, Z-WAVE, near field communication ("NFC"), etc., may be used to communicate between the server 820 and one or more plug-in sensors, communication components, communication hubs, and/or devices.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, energy management, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computing system, comprising:
   one or more processors; and
   a memory storing program instructions that, when executed by the one or more processors, cause the one or more processors to, at least:
   receive voltage measurement data from a plug-in sensor installed at a location;
   determine, in response to receipt of the voltage measurement data, a deep neural network ("DNN") that is to be trained to detect at least one of a device type or a device state from voltage data measured at the location;
   obtain a first location embedding vector for the location, wherein the first location embedding vector is representative of a first voltage measured at the location;
   determine, based at least in part on a first comparison between the first location embedding vector and a plurality of known embedding vectors for each of a plurality of known locations, a first sub-plurality of known locations of the plurality of known locations;
   obtain a second location embedding vector for the location, wherein the second location embedding vector is representative of a second voltage measured at the location;
   determine, based at least in part on a second comparison between the second location embedding vector and the plurality of known embedding vectors, a second sub-plurality of known locations of the plurality of known locations;
   identify, from the plurality of known locations, a third plurality of known locations that appear in both the first sub-plurality of known locations and the second sub-plurality of known locations;

include at least a portion of labeled data associated with the third plurality of known locations in a training data for the DNN to generate up-sampled training data for the location;

process, as a part of a first epoch of a training of the DNN, a data sample of the up-sampled training data to produce an output generated by the DNN;

determine, based at least in part on the output and a label associated with the data sample, that the data sample of the up-sampled training data is to be discarded;

discard the data sample from the up-sampled training data;

complete the training of the DNN based at least in part on the up-sampled training data without further processing of the data sample of the up-sampled training data that was discarded to produce a trained DNN;

deploy the trained DNN to process the voltage data measured from the plug-in sensor; and determine, using the trained DNN and based at least in part on the processed voltage data, at least one of the device type or the device state at the location.

2. The computing system of claim 1, wherein the first comparison indicates a disagreement between the output and the label.

3. The computing system of claim 1, wherein the program instructions, that when executed by the one or more processors, further include instruction that cause the one or more processors to, at least:

compare the first location embedding vector with the known embedding vectors for each of the plurality of known locations, wherein the first comparison is based at least in part on a distance in a multidimensional space between the first location embedding vector and each of the plurality of known embedding vectors.

4. The computing system of claim 1, wherein the labeled data includes a signal representative of at least one of the device type or the device state.

5. The computing system of claim 1, wherein:

the program instruction that, when executed by the one or more processors to cause the one or more processors to determine, based at least in part on the first comparison between the first location embedding vector and the plurality of known embedding vectors for each of a plurality of known locations, further include instructions that cause the one or more processors to determine at least a first known location and a second known location; and at least a portion of labeled data associated with the first known location is included in the up-sampled training data and at least a portion of labeled data associated with the second known location is included in the up-sampled training data.

6. A method, comprising:

receiving voltage measurement data from a plug-in sensor installed at a location;

determining, in response to receiving the voltage measurement data, a deep neural network ("DNN") that is to be trained to detect at least one of a device type or a device state from voltage data measured at the location;

comparing a first location embedding vector representative of a first voltage signal at the location with at least some of a plurality of known embedding vectors to determine a first sub-plurality of known locations of a plurality of known locations, each known embedding vector representative of a voltage signal at a known location of the plurality of known locations;

comparing a second location embedding vector representative of a second voltage signal at the location with at least some of the plurality of known embedding vectors to determine a second sub-plurality of known locations of the plurality of known locations;

identifying, from the plurality of known locations, a third plurality of known locations that appear in both the first sub-plurality of known locations and the second sub-plurality of known locations;

generating an up-sampled training data that includes:

first labeled data corresponding to a first known location selected from the third plurality of known locations; and second labeled data corresponding to a second known location selected from the third plurality of known locations;

training the DNN based at least in part on the up-sampled training data to generate a trained DNN;

deploying the trained DNN to process the voltage data measured from the plug-in sensor; and determining, using the trained DNN and based at least in part on the processed voltage data, at least one of the device type or the device state at the location.

7. The method of claim 6, wherein training the DNN further includes:

processing, as a part of a first epoch of the training, a data sample of the up-sampled training data to produce an output generated by the DNN;

determining, based at least in part on the output and a label associated with the data sample, that the data sample of the up-sampled training data is to be discarded;

discarding the data sample from the up-sampled training data; and completing the training of the DNN based at least in part on the up-sampled training data without further processing of the data sample of the up-sampled training data that was discarded.

8. The method of claim 7, wherein training the DNN further includes:

processing, as a part of the first epoch of the training, a second data sample of the up-sampled training data to produce a second output generated by the DNN;

determining, based at least in part on the second output and a second label associated with the second data sample, that the second data sample of the up-sampled training data is to be retained; and completing the training of the DNN based at least in part on the up-sampled training data without further processing of the data sample of the up-sampled training data that was discarded and considering the second data sample of the up-sampled training data.

9. The method of claim 7, wherein completing the training further includes:

completing a first epoch of a processing of the up-sampled training data; and completing a second epoch of the processing of the up-sampled training data without considering the data sample, wherein the second epoch is completed subsequent to completing the first epoch.

10. The method of claim 7, wherein determining that the data sample of the up-sampled training data is to be discarded further includes:

determining a difference between the output of the DNN and the label associated with the data sample;

determining that the difference exceeds a threshold; and in response to determining that the difference exceeds the threshold, determining that the data sample of the up-sampled training data is to be discarded.

11. The method of claim 6, further comprising:

detecting an addition of the plug-in sensor at the location; and wherein determining the at least one of the device type or the device state for which the DNN is to be trained is in response to determining the addition of the plug-in sensor.

12. The method of claim 6, wherein:

comparing the first location embedding vector with at least some of the plurality of known embedding vectors, further includes determining, for each comparison of the first location embedding vector with a known embedding vector of the at least some of the plurality of known embedding vectors, a similarity score indicative of a similarity between the first location embedding vector and the known embedding vector; and the first known location is determined to have a highest similarity score.

13. The method of claim 6, wherein the first voltage signal corresponds to a first voltage measured at the location during a first period of time and the second voltage signal corresponds to a second voltage measured at the location during a second period of time.

14. The method of claim 6, wherein:

the first sub-plurality of known locations are indicative of known locations having highest similarities with the first location embedding vector; and the second sub-plurality of known locations are indicative of known locations having highest similarities with the second location embedding vector.

15. A computer-implemented method, comprising:

receiving voltage measurement data from a plug-in-sensor installed at a location;

determining, in response to receiving the voltage measurement data, a deep neural network ("DNN") that is to be trained to determine at least one of a device type or a device state from voltage data measured at the location;

comparing a first location embedding vector representative of a first voltage signal at the location with at least some of a plurality of known embedding vectors to determine a first sub-plurality of known locations of a plurality of known locations, each known embedding vector representative of a voltage signal at a known location of the plurality of known locations;

comparing a second location embedding vector representative of a second voltage signal at the location with at least some of the plurality of known embedding vectors to determine a second sub-plurality of known locations of the plurality of known locations;

identifying, from the plurality of known locations, a third plurality of known locations that appear in both the first sub-plurality of known locations and the second sub-plurality of known locations;

generating training data that includes labeled data corresponding to known locations selected from the third plurality of known locations;

processing, as a part of a first epoch of a training of the DNN with the training data:

a first data sample of the training data to produce a first output generated by the DNN; and a second data sample of the training data to produce a second output generated by the DNN;

determining, based at least in part on the first output and a first label associated with the first data sample, that the first data sample is to be discarded;

excluding the first data sample from a subsampled training data;

determining, based at least in part on the second output and a second label associated with the second data sample, that the second data sample is to be retained;

retaining the second data sample as part of the subsampled training data; and completing the training of the DNN based at least in part on the subsampled training data and without further considering the first data sample to generate a trained DNN;

deploying the trained DNN to process the voltage data measured from the plug-in sensor; and determining, using the DNN and based at least in part on processed voltage data, at least one of the device type of the device state at the location.

16. The computer-implemented method of claim 15, further comprising:

determining a threshold for the first epoch; and wherein determining that the first data sample is to be discarded further includes:

determining that a difference between the first output and the first label exceeds the threshold.

17. The computer-implemented method of claim 15, wherein completing the training of the DNN further includes:

completing a second epoch of training with the subsampled training data without considering the first epoch.

18. The computer-implemented method of claim 15, wherein the training data includes data collected from a second location that is determined to have a similarity with the location.

19. The computer-implemented method of claim 15, wherein:

determining that the first data sample is to be discarded is based at least in part on a threshold; and determining that the second data sample is to be retained is based at least in part on the threshold.

* * * * *